United States Patent [19]
Sawicki

[11] Patent Number: 4,946,303
[45] Date of Patent: Aug. 7, 1990

[54] ANGULARLY MOVABLE ROLLING BOOT

[75] Inventor: Slawomir Sawicki, Dietzenbach, Fed. Rep. of Germany

[73] Assignee: Löhr & Bromkamp GmbH, Offenbach am Main, Fed. Rep. of Germany

[21] Appl. No.: 180,365

[22] Filed: Apr. 11, 1988

[30] Foreign Application Priority Data

Apr. 10, 1987 [DE] Fed. Rep. of Germany ....... 3712199

[51] Int. Cl.⁵ .............................................. F16J 15/52
[52] U.S. Cl. ...................... 403/50; 403/288; 464/175; 464/906; 277/212 FB
[58] Field of Search ................ 403/50, 51, 288, 134; 464/133, 141, 906, 146, 173, 175; 277/212 FB

[56] References Cited

U.S. PATENT DOCUMENTS

| | | | |
|---|---|---|---|
| 2,510,362 | 6/1950 | Anderson | 464/175 |
| 2,544,541 | 3/1951 | McCarthy et al. | 403/50 |
| 3,707,852 | 1/1973 | Burckhardt et al. | 464/133 X |
| 4,004,435 | 1/1977 | Rubin | 464/175 |
| 4,369,979 | 1/1983 | Krude et al. | 277/212 FB |
| 4,419,027 | 12/1983 | Trudeau | 403/134 |
| 4,456,269 | 6/1984 | Krude et al. | 277/212 FB |
| 4,630,834 | 12/1986 | Müller et al. | 277/212 FB |
| 4,664,393 | 5/1987 | Hazebrook | 464/133 X |
| 4,747,805 | 5/1988 | Welschof et al. | 464/906 X |

FOREIGN PATENT DOCUMENTS 3500429 8/1985 Fed. Rep. of Germany ...... 464/175

OTHER PUBLICATIONS

Handbuch der Dichtungstechnick, Feb. 1981, pp. 248–251.

Primary Examiner—Peter M. Cuomo
Attorney, Agent, or Firm—Toren, McGeady & Associates

[57] ABSTRACT

An angularly movable rolling boot, for sealing a universal joint, sealingly encloses a shaft journal with a sleeve which is integrally formed with a wall of the boot. The sleeve is fitted onto the shaft journal under radial pretensioning which increases axially towards a free end of the sleeve.

8 Claims, 3 Drawing Sheets

ANGULARLY MOVABLE ROLLING BOOT

DESCRIPTION

The invention relates to an angularly movable rolling boot for sealing a universal joint, which boot on the one hand is attached to the outer joint part and on the other hand sealingly encloses a shaft journal connected to the joint, with a sleeve formed on to the boot wall so as to be integral with it continuously resting against an axial portion of the shaft journal.

Rolling boots of this kind are used in particular for sealing universal joints which permit an axial displacement between the outer joint part and the inner joint part with the shaft journal, while at the same time relatively large joint angles have to be bridged.

A rolling boot of the said type is known from DE-GM No. 70 18 479 for example. This boot has been provided with a reinforced sleeve which adjoins the boot wall and is fitted on a smooth portion of the shaft journal. Axial fixing in this case is effected by a special tensioning strip, the disadvantage of this design being the critical transition from the fixed sleeve to the boot wall, where due to the method of fixing the sleeve all movements have to be accommodated by the connecting region. In the long run, this may lead to the material being weakened and damaged. In spite of the sophisticated fixing method involving a special tensioning strip, axial movement of the sleeve on the smooth shaft portion may occur.

A similar rolling boot is known from GB No. 94 85 39 where instead of a sleeve provision has been made for a bead which engages a circumferential groove of the shaft journal and is fixed by a spring washer. In this case, too, a separate element is required for fixing purposes, and again, the connection between the bead and the boot wall represents a weak area because this is where all the articulation movements have to be accommodated.

A further rolling boot is known from DE No. 30 43 314 C 2 where a special sleeve engages a shaft recess where it is fixed by a plate metal sleeve. At the groove step at the joint end, there developed a sharply defined tensioned region where in spite of the adjoining continuous wall thickness transition, particularly high loads on the material have to be expected.

It is the object of the present invention to propose a rolling boot and its use on the shaft journal which, as compared to prior art proposals, reduces the load on the material, even with large angular and plunge movements, and ensures safe sealing while having a simple design. The objective is achieved in that the sleeve is fitted on the shaft journal without any connecting means and that it is pretensioned on the axial portion of the shaft journal, with this pretension increasing towards the free end of the sleeve, the effect of the design in accordance with the invention being that when the joint carries out an angular plunging movements, the area of transition from the boot wall to the sleeve is resilient to a certain extent so that there will be no sharply defined bending areas, but that in view of the increasing pretension towards the free end sealing is fully ensured.

In a first possible embodiment of the invention, radial coverage between the untensioned, unfitted boot and the shaft journal increases towards the free end of the sleeve, which means that in the fitted condition the free end is subject to a greater measure of radial expansion than the end forming the transition to the boot wall. This is largely determined by the inner shape of the untensioned sleeve relative to the cross-section of the shaft journal.

According to a second possible embodiment of the invention, the axial increase in the pretension towards the free end of the sleeve is achieved by an increasing wall thickness of the sleeve. This may also be achieved with an axially constant coverage or difference in diameter between the untensioned sleeve and the shaft journal.

In an advantageous embodiment, the two above-mentioned measures are combined so that both the wall thickness and radial coverage and radial expansion towards the free shaft end increase as uniformly as possible, and it is advantageous to permit the sleeve to engage a groove which runs out in the direction of the adjoining boot wall so that due to selecting an obtuse angle, disadvantageous effects of an edge are eliminated or reduced to a minimum.

In order to achieve improved axial fixing, the sleeve may be complemented, at its free end where no movements are expected, by an inner collar engaging a special indentation. It is also possible for the sleeve, at its free end, to adjoin a special collar of the shaft journal.

To keep the deformation of the boot wall and of the transition from the boot wall to the sleeve as small as possible, this transision, in a preferred embodiment, has been positioned as close as possible to the joint centre, i.e. the sleeve is freely accessible outside the joint sealed by the boot wall on the shaft journal, with its free end pointing away from the joint centre. This means that with predetermined angular movements, the transverse movements of the rolling boot are slight so that the transition area at risk is not subjected to great changes in shape.

Furthermore, it is advantageous for the boot wall, in the region of the transition to the sleeve, to reset against an end face of the inner joint part attached to the shaft journal, at least when the joint is in the extended position, an arrangement which provides further sealing during standard operation.

Further details are given in the description of the enclosed drawings wherein

Figure 1:
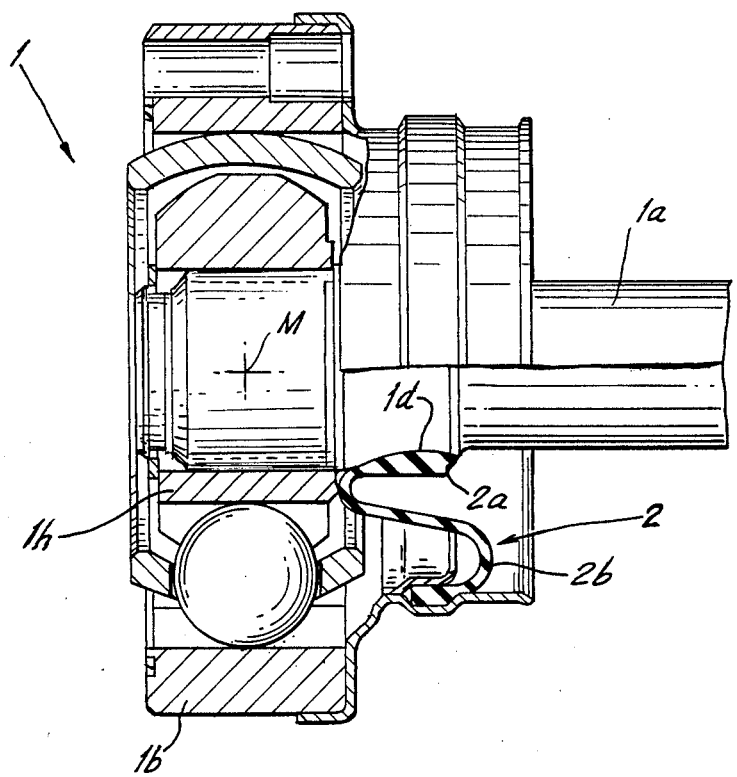
FIG. 1 shows a constant velocity joint fitted with a rolling boot in according with the invention.

FIG. 1 shows an axially plungeable constant velocity universal joint 1 having an outer joint part 1b and an inner joint part 1h into which a shaft journal 1a has been inserted. At one end, the joint is sealed by a rolling boot 2 which essentially consists of a boot wall 2b connected to the outer joint part 1b via a plate metal cap, and of an axially extending sleeve 2a engaging a flat groove 1d on the shaft journal 1a.

Figure 2:
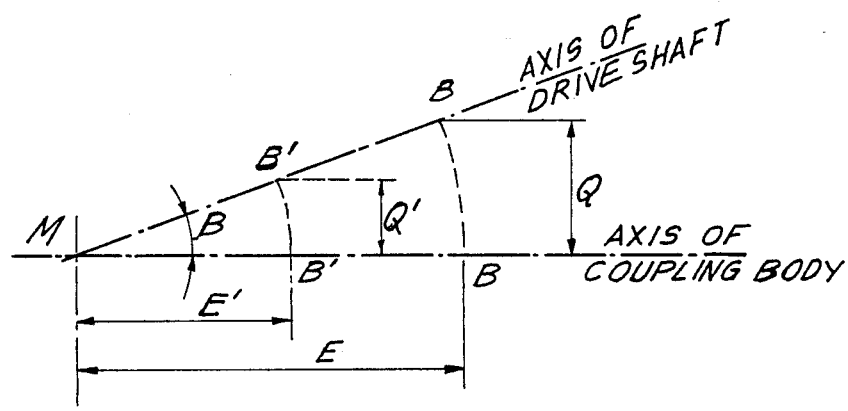
FIG. 2 is a diagram showing that the transverse movement depends on the distance from the centre.

FIG. 2 shows the transverse displacement Q being linearly dependent on the distance from the centre, i.e. the distance E from the joint centre M. If a fixing point D is moved closer to the joint centre, i.e. to D', with a predetermined joint angle β, the transverse displacement Q is reduced relative to the reduced transverse displacement Q'. The transverse movement Q represents the movement to be accommodated by the rolling boot, which movement involves a change in shape when the shaft is articulated relative to the outer joint part.

Figure 3:
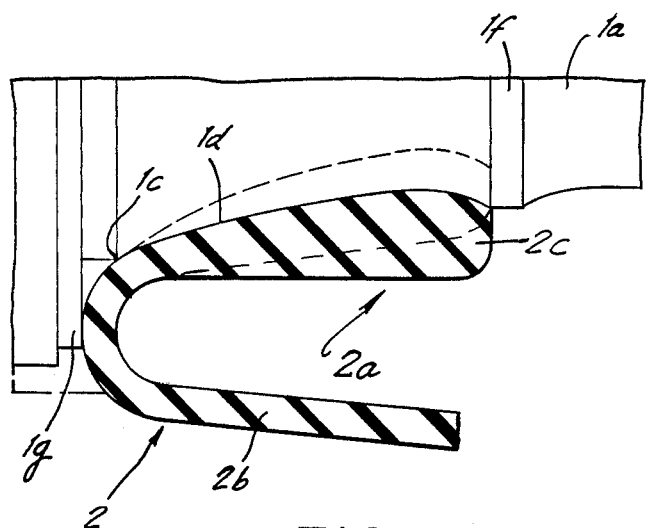
FIG. 3 illustrates a first embodiment of a sleeve of a rolling boot in accordance with the invention, arranged on the shaft end.

FIG. 3 shows the sleeve 2a of the boot 2, which engages the groove 1d in the shaft journal 1a. The dashed lines indicate the shape of the untensioned rolling boot before being pulled on to the shaft end, indicating the radial coverage and radial pretension increasing from the groove run-out 1c at the joint end towards the free boot end 2c. Analogously, the wall thickness of the sleeve 2a increases continuously towards the free end 2c. An end face 1g of the inner joint part is in contact with the area of transition from the sleeve 2a to the boot wall 2b and provides additional sealing for the joint. The shaft end 1a has been provided with a collar if as an axial stop for fixing the sleeve.

Figure 4:
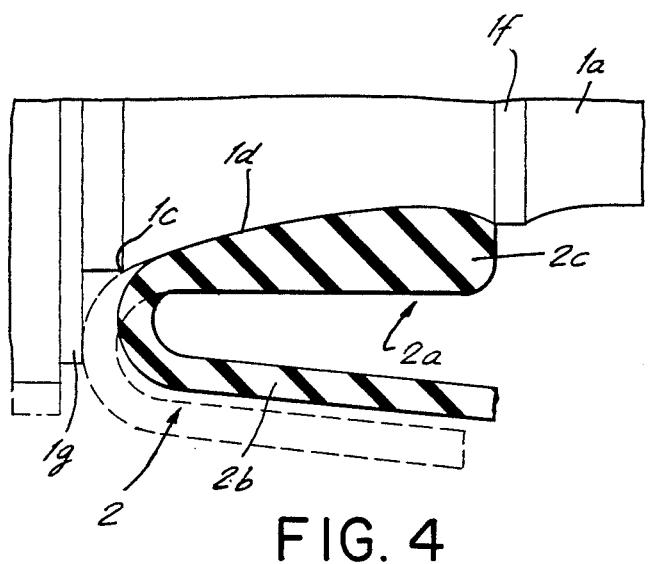
FIG. 4 shows the sleeve to FIG. 3 in two joint positions.

FIG. 4 contains the same reference numbers as FIG. 3, with the original position of the sleeve on an extended and axially centrally positioned joint being shown in dashed lines, whereas the deformation of the sleeve with an articulated and/or axially displaced joint being given in continuous lines.

Figure 5:
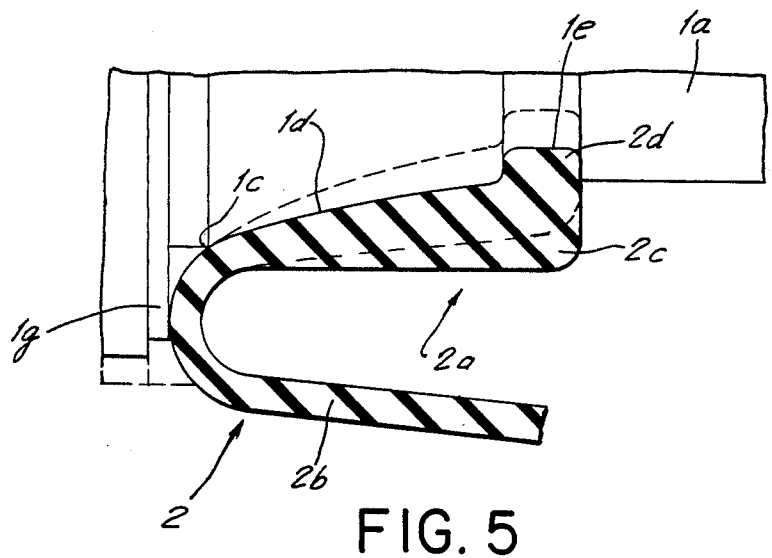
FIG. 5 illustrates a second embodiment of a sleeve of a rolling boot in accordance with the invention, arranged on the shaft end.

FIG. 5 shows a sleeve 2a of a rolling boot 2 in accordance with the invention being essentially in the same position as illustrated in FIG. 3, but with the free end 2c of the sleeve 2a being provided with an inner collar 2d engaging an indentation 1e in the groove 1d, which otherwise has the same design as that shown in FIG. 3, especially having the flat run-out 1c at the transition from the sleeve 2a to the boot wall 2b. In this case, too, the contact with the end face 1g at the inner joint part provides additional sealing of the joint. Again, the rolling boot, and especially its sleeve in the untensioned condition prior to assembly is shown in dashed lines so that in addition to the wall thickness increasing towards the free end, the increasing radial coverage of the shaft journal 1a and the increasing radial pretension are clarified.

Figure 6:
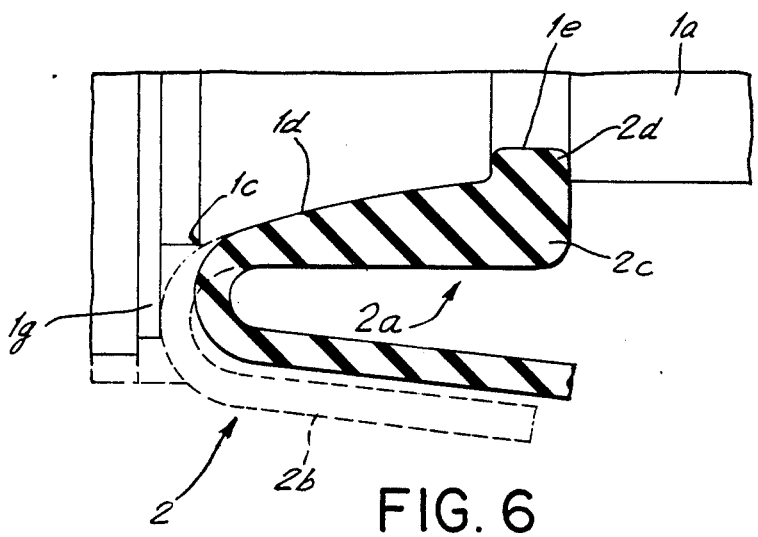
FIG. 6 shows the sleeve to FIG. 5 in two joint positions.

FIG. 6 shows the sleeve to FIG. 5 in dashed lines, with the joint being in the extended position and in an axially central position, whereas the deformation of the sleeve with the joint being articulated and/or axially displaced being shown in continuous lines. It can be seen that there is no sharply defined bent area but that the rolling boot without losing any of its sealing functions can partially lift off the shaft end 1a. The loads on the material are reduced.

I claim:

1. An angularly movable rolling boot for sealing a universal joint, said boot being attachable to an outer part of a joint so as to sealingly enclose a shaft journal connected to the joint, and having a sleeve formed integrally on a wall of the boot so as to continuously rest under radial pretensioning against an axial portion of the shaft journal, the sleeve (2a) being fitted on the shaft journal (1a) without any connecting means and pretensioning on the axial portion of the shaft journal (1a) increasing axially towards a free end (2c) of the sleeve so that the boot can be initially rolled off a portion of the shaft with a small force and so that resistance to rolling off increases as rolling off continues so as to prevent creation of a sharp bending edge.

2. A rolling boot according to claim 1, wherein
a measure of radial expansion of the sleeve (2a) between a free untensioned condition and a condition when pulled on to a shaft end increases especially continuously towards the free end (2c) of the sleeve.

3. A rolling boot according to claim 1, wherein
the sleeve (2a) has a wall thickness that increases from its connection to the boot wall (2b) to its free end (2c) in a continuously changing way.

4. A rolling boot according to claim 1, wherein
the sleeve (2a) is provided so as to engage a groove (1d) which in a direction towards adjoining the boot wall (2b) comprises a flat run-out (1c) in its longitudinal section.

5. A rolling boot according to claim 4, wherein
the sleeve (2a) is axially fittable and includes an inner collar (2d) which is arranged at its free end (2c) so as to engage an indentation (1e) of the groove (1d).

6. A rolling boot according to claim 1, wherein
the sleeve (2a) is provided so as to rest with its free end (2c) against a collar (1f) of the shaft journal (1a) so as to be axially fittable.

7. A rolling boot according to claim 1, wherein
the sleeve (2a) is provided so as to adjoin the boot wall (2b) at a sleeve end which is axially nearer the center of the joint.

8. A rolling boot according to claim 1, wherein
a transition of the sleeve (2a) to the boot wall (2b), at least when the joint is in an extended condition, sealingly rests against an end face (1g) of an inner part of the joint.

* * * * *